US00RE44204E

(19) United States
(12) Reissued Patent
Dix et al.

(10) Patent Number: US RE44,204 E
(45) Date of Reissued Patent: May 7, 2013

(54) HIGH TORQUE RETENTION JOINT IN A TENSIONER

(75) Inventors: Harvey J. Dix, Thornton (CA); Jesse Dupuis, Hamilton (CA)

(73) Assignee: Litens Automotive Partnership, Woodbridge (CA)

(21) Appl. No.: 12/315,063

(22) Filed: Nov. 26, 2008

Related U.S. Patent Documents

Reissue of:

(64) Patent No.: 7,140,992
Issued: Nov. 28, 2006
Appl. No.: 10/297,694
PCT Filed: Jun. 13, 2001
PCT No.: PCT/CA01/00861
§ 371 (c)(1),
(2), (4) Date: Dec. 6, 2002
PCT Pub. No.: WO01/96762
PCT Pub. Date: Dec. 20, 2001

U.S. Applications:

(60) Provisional application No. 60/211,945, filed on Jun. 16, 2000.

(51) Int. Cl.
*F16H 7/08* (2006.01)

(52) U.S. Cl.
USPC ..... 474/117

(58) Field of Classification Search ..... 474/101, 474/109, 111, 113, 115, 117
See application file for complete search history.

(56) References Cited

U.S. PATENT DOCUMENTS

| | | | | |
|---|---|---|---|---|
| 3,734,697 | A * | 5/1973 | Sieghartner | 29/889.23 |
| 4,557,707 | A | 12/1985 | Thomey | |
| 5,015,217 | A * | 5/1991 | Henderson | 474/135 |
| 5,030,172 | A * | 7/1991 | Green et al. | 474/135 |
| 5,472,243 | A | 12/1995 | Ruggles et al. | |
| 5,803,850 | A | 9/1998 | Hong et al. | |
| 6,196,941 | B1 * | 3/2001 | Ohta et al. | 474/135 |

FOREIGN PATENT DOCUMENTS

| | | |
|---|---|---|
| EP | 0 857 890 A2 | 12/1997 |
| FR | 2.026.590 | 12/1970 |
| FR | 2 772 317 | 12/1997 |

OTHER PUBLICATIONS

Patent Abstracts of Japan Publication No. 57025232 Publication Date: Oct. 2, 1982 Title: Production of Plate Like Member Having Hollow Shaft Part.

* cited by examiner

*Primary Examiner* — Robert A Siconolfi
*Assistant Examiner* — Anna Momper
(74) *Attorney, Agent, or Firm* — Harness, Dickey & Pierce, P.L.C.

(57) ABSTRACT

A method of manufacturing a tensioner (10) by mounting an end member (38) on an end of a hollow tensioner shaft (24) includes a step of providing an end member (38) of sheet material with an opening (76) having a plurality of annularly spaced inwardly extending pointed projections (78). A hollow shaft (24) has an outwardly extending shoulder (82) at an end portion thereof. A relative axial movement between the end member (38) and the hollow shaft (24) is effected so that the end member (38) abuts against the shoulder (82) of the hollow shaft (24). The hollow shaft (24) is deformed at the end portion radially outward to embed the projections (78) into the hollow shaft (24) to thereby form a joint (32) therebetween.

7 Claims, 3 Drawing Sheets

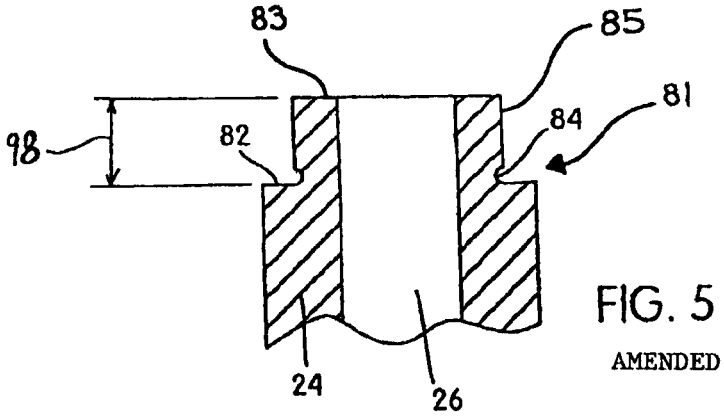
FIG. 5
AMENDED

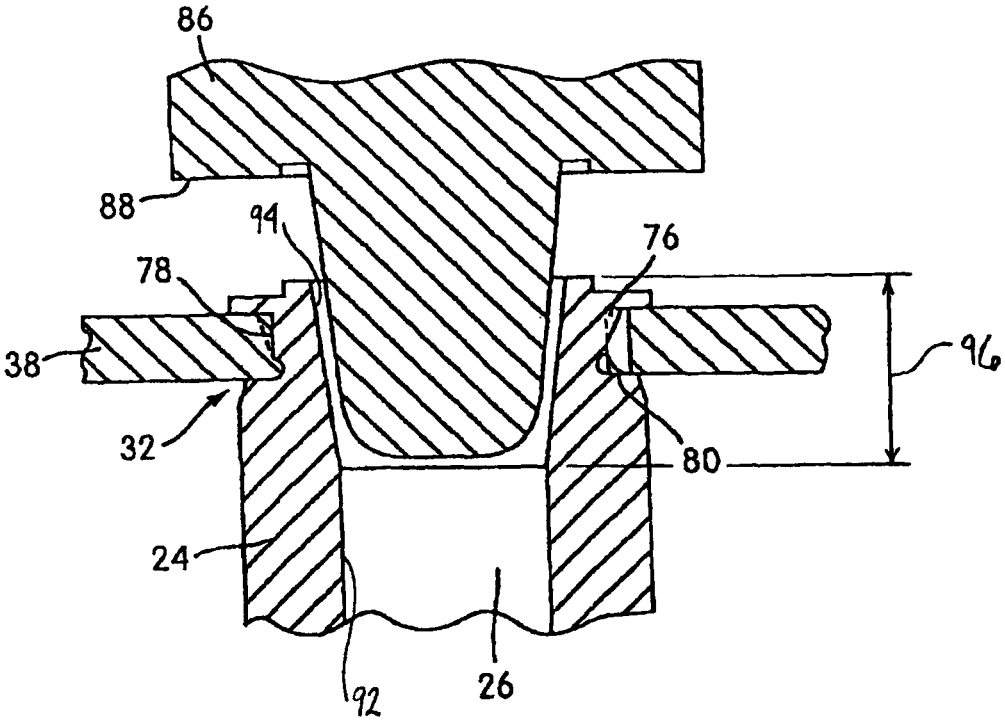
FIG. 7
AMENDED

HIGH TORQUE RETENTION JOINT IN A TENSIONER

Matter enclosed in heavy brackets [ ] appears in the original patent but forms no part of this reissue specification; matter printed in italics indicates the additions made by reissue.

RELATED APPLICATION

This application *is a reissue of U.S. application Ser. No. 10/297,694, filed Dec. 6, 2002, now U.S. Pat. No. 7,140,992, which* is a 371 filing of PCT Application CA01/00861, filed Jun. 13, 2001, which claimed priority to and all the benefits of U.S. Provisional Application No. 60/211,945, filed on Jun. 16, 2000.

FIELD OF INVENTION

This invention relates to tensioners and more particularly to tensioners having a high torque retention joint.

BACKGROUND OF THE INVENTION

Belt tensioners of the type herein contemplated are exemplary of those used to tension the serpentine belt drive of a motor vehicle engine. Other types of tensioners contemplated are those used for timing belts. A tensioner of the type herein contemplated includes a fixed structure, which is usually fixed to the engine housing and a pivoting structure mounted on the fixed structure for pivotal movement about a pivotal axis. A spring is operatively connected between the fixed structure and the pivotal structure so as to pivot the pivotal structure in one direction about the pivotal structure. The pivoting structure carries a belt-engaging pulley for rotational movement about a rotational axis parallel with the pivotal axis. The pivotal movement of the pivoting structure applies a constant tension to the belt and to compensate for increases and decreases in the belt path length due to temperature changes and wear.

The fixed structure comprises a hollow shaft and an end member. The hollow shaft transmits the torque created by the spring to the end member. The end member comprises tensioner stops or locating pins that allow for the transmission of torque to the mounting structure. A common form of locating pins is a pair of diametrically opposed knobs protruding from the outward-facing surface of the end member. Since the entire magnitude of torque produced by the spring must be transmitted to the mounting structure through the joint between the end member and hollow shaft, a rigid joint is required between these members that is capable of resisting torque.

A common method currently employed for the purpose of joining the shaft and the end member is casting a positive torque retention feature into the end of a cast aluminum shaft. This allows the two elements to be joined, with material of the end portion of the shaft deformed over the outer surface of the end member. This practice creates a rigid joint capable of torque retention, but is limited to a cast aluminum shaft design. Additional operations may be added to create a torque retention feature on a steel shaft; however production costs are increased.

There is a need for a cost-effective method of producing a joint that is capable of high torque retention between a shaft and an end member of a tensioner and for a more cost-effective tensioner embodying such a joint.

SUMMARY OF THE INVENTION

It is an object of the present invention to fulfill the above need. In accordance with the principles of the present invention, this objective is achieved by providing a method of mounting a tensioner end member on an end of a hollow tensioner shaft. This method comprises the process of stamping, from a sheet of metal having a predetermined thickness, an end member with a central opening having an interior periphery formed with annularly spaced inwardly extending pointed projections. A hollow shaft is formed having an exterior axially outwardly facing shoulder in one end portion spaced a distance from an associate end greater than the predetermined sheet metal thickness. A relative axial movement between the end member and hollow shaft is effected sufficient to engage the end member against the shoulder of the hollow shaft. Finally, the one end portion is deformed radially outwardly and a section of the one end portion, extending beyond the end member, is deformed axially inwardly into abutting engagement with an outwardly facing surface of the end member adjacent the central opening. The sharpness of the projections causes the metal of the hollow shaft end portion to deform within the spaces between said projections in such a way that the metal of the projections becomes embedded within the metal of the hollow shaft, thereby resisting relative movement between the hollow shaft and the end member.

The tensioner embodying the principles of the present invention made from the method comprises a fixed structure for fixedly attaching the tensioner to a mounting structure. A pivoting structure is mounted on the fixed structure capable of pivotal movements in opposite directions about a pivotal axis. A pulley is mounted on the pivoting structure for rotational movement about an axis parallel to said pivotal axis. A spring is operatively connected between said fixed structure and said pivoting structure to resiliently urge the pivoting structure in a belt engaging direction. The fixed structure includes a metal hollow shaft having an axis coincident with the pivotal axis and an end member formed of sheet metal of predetermined thickness constructed and arranged to be mounted to one end of the hollow shaft. The end member includes a central opening having a periphery formed with annularly spaced inwardly extending projections. The hollow shaft has an exterior axially outwardly facing shoulder formed on the one end at a distance greater than the predetermined thickness of the end member. The end member is mounted on the hollow shaft in abutting engagement with the shoulder. The hollow shaft one end portion is deformed radially outwardly and a section of the one end portion extends beyond the end member. This section is then deformed axially inwardly into abutting engagement with an outwardly facing surface of the end member adjacent the central opening. The metal of the sharp projections cause the metal of the end portion of the hollow shaft to deform within the spaces between the projections. The metal of the projections then becomes embedded within the metal of the hollow shaft to thereby resist relative movement between the hollow shaft and the end member.

BRIEF DESCRIPTION OF THE DRAWINGS

FIG. 5 is an enlarged axial cross-sectional view of the one end portion of the hollow shaft as it is made initially.

FIG. 7 is an axial cross-sectional view of the one end portion of the shaft and its connection with the end member taken showing a punch which has completed the connection in a withdrawn position.

DETAILED DESCRIPTION OF THE PREFERRED EMBODIMENT OF THE INVENTION

Figure 1:
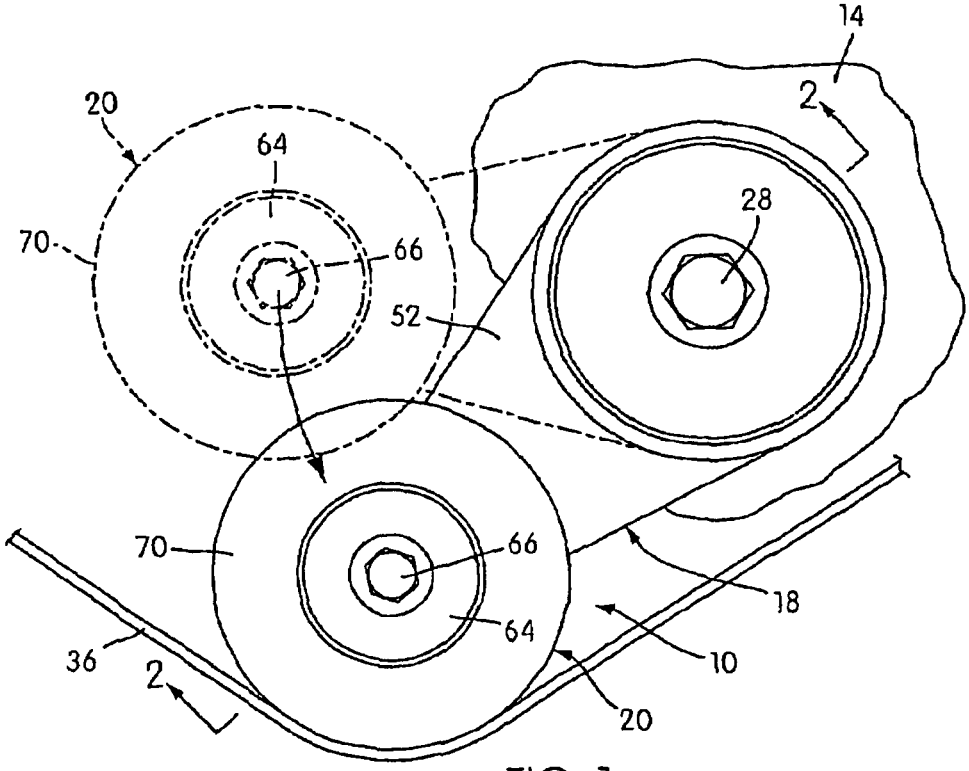
FIG. 1 is a side elevational view of a tensioner embodying the principles of the present invention showing the same in tensioning relation to a belt in an extended second position thereof in solid lines and in a first position in dotted lines.
Figure 2:
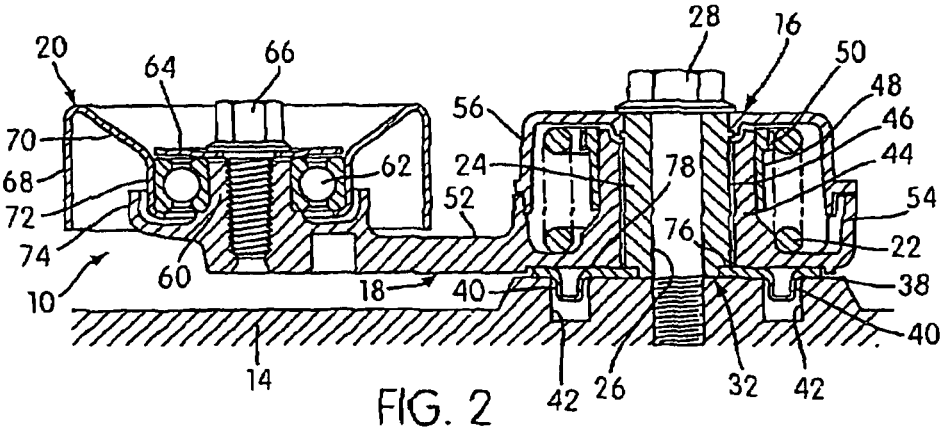
FIG. 2 is a cross-sectional view of the tensioner taken along line 2-2 of FIG. 1.

Referring now more particularly to the drawings, there is shown therein a tensioner, generally indicated at 10, which embodies the principles of the present invention. The tensioner 10 is operable to be mounted on a mounting structure such as an automotive vehicle engine housing, a portion of which is generally illustrated in FIGS. 1 and 2 at 14.

The tensioner 10 comprises, in general, a fixed structure, generally indicated at 16, and a pivotal structure, generally indicated at 18, pivotally mounted on the fixed structure 16 for pivotal movements with respect thereto about a pivotal axis central to said fixed structure. A pulley, generally indicated at 20 in FIGS. 1 and 2, is rotatably mounted on the pivotal structure 18 for rotational movement about a rotational axis parallel with the pivotal axis. A spring in the form of a torsion coil spring 22 is mounted between the fixed structure 16 and the pivotal structure 18 for resiliently urging the pivotal structure 18 in one direction, which corresponds to a movement of the pulley 20 in a belt tensioning relation.

The fixed structure 16 includes a hollow metal shaft 24 having a throughbore 26 extending axially therethrough. As shown in FIG. 2, the throughbore 26 receives a mounting bolt 28 that serves to fixedly attach the fixed structure 16 to the mounting structure 14.

The present invention is particularly concerned with a high torque retention joint generally indicated at 32, between one axial end of the hollow shaft 24 and an end member 38 forming a part of the fixed structure 16. The joint 32 is further described hereinafter.

Figure 3:
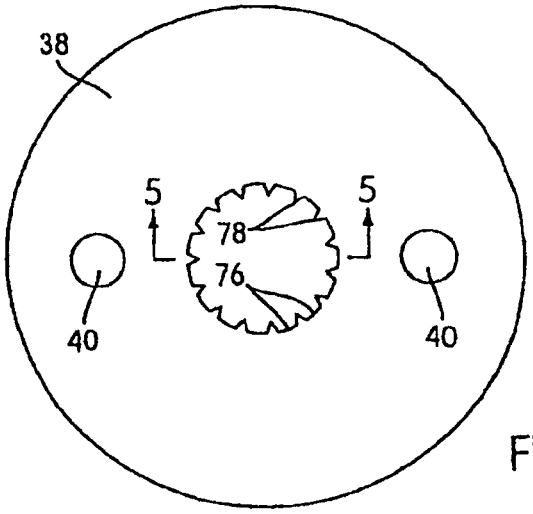
FIG. 3 is an enlarged top plan view of the end member of the present invention as it is punched from sheet metal stock.

As shown in detail in FIG. 3, the end member 38 includes a pair of mounting knobs 40 protruding axially outwardly from an outer surface of the metal end member 38. The mounting knobs 40 are configured and positioned to engage within a pair of mating recesses 42 within the mounting structure 14. The mounting bolt 28 extends through the throughbore 26 of the hollow shaft 24 and is threadedly engaged within the mounting structure 14. The bolt 28 thus mounted maintains the knobs 40 within the recesses 42 to maintain a constant position relative to mounting structure 14. The torsion spring 22 resiliently biases the pulley 20 toward a position into tensioning relation to the belt 36. Shown in FIG. 2 is a pair of mounting knobs 40 and associated mating recesses 42 arranged in a diametrically opposed configuration. However, it is also contemplated that the present invention may employ only a singular mounting knob and mating recess, or an associated plurality of both, having any configuration necessary to maintain a constant position of the tensioner 10 relative to the mounting structure 14.

The tensioner 10, as shown, is preferably a proportionally dampened tensioner of the type disclosed in U.S. Pat. No. 4,473,362. As shown, the pivotal structure 18 includes a hub portion 44, which is journaled on the hollow metal shaft 24, by a suitable bearing sleeve 46. A flanged damping sleeve 48 is mounted on the exterior periphery of the arm hub portion 44 with its flange in engagement with the inner surface of the fixed structure 16 axially opposite the end member 38. A force-transmitting ring 50 is mounted in surrounding relation to the damping sleeve 48 adjacent its flange and in radial abutment with an adjacent volute of the torsion spring 22. As the spring 22 expands and contracts during the operational movements of the pivotal structure 18, a proportional force is transmitted from the spring 22 to damping sleeve 48 through the ring 50. The proportional spring force is reflected in a proportional sliding frictional damping force that controls the movements of the pivotal structure 18 with respect to the fixed structure 16.

The pivotal structure 18 also includes an arm structure 52 that is integral with one end of the hub portion 44 and extends radially outwardly therefrom. The circular-shaped inner section of the arm portion 52 is formed with an axially inwardly projecting annular flange portion 54 having a free end which cooperates with the free end of an axially inwardly extending annular flange portion 56 formed integrally on the outer periphery of the inner surface of the fixed structure 16 axially opposite the end member 38. The flange portions 54 and 56 serve to substantially enclose the spring 22.

The pivotal structure 18 includes an integral shaft portion 60, which extends axially inwardly from the outer end of the arm structure 52. The exterior periphery of the shaft portion 60 has the inner race of a ball bearing assembly 62 fixed thereon as by a washer 64 and a headed bolt 66 suitably threadedly engaged within the shaft portion 60. The head of the bolt 66 serves as a tool-receiving element that aids in installation of the tensioner 10.

The pulley 20 is shown as being made of sheet metal so as to provide an outer annular wall 68 having a smooth belt engaging peripheral surface. It will be understood that the pulley wall 68 could be configured to present a poly groove-engaging surface of the like. As shown, the pulley 20 includes a circular wall 70 extending radially and axially inwardly from one end of the outer annular wall 68 which terminates in an integral hub portion 72 engaged with the outer race of the ball bearing assembly 62. The pivotal structure 18 also includes an integral cup shaped portion 74 that generally surrounds the inner end of the ball bearing.

The Method and Resulting Joint

The high torque retention joint 32 embodying the principles of the present invention is between the end member 38 and the hollow metal shaft 24.

Figure 4:
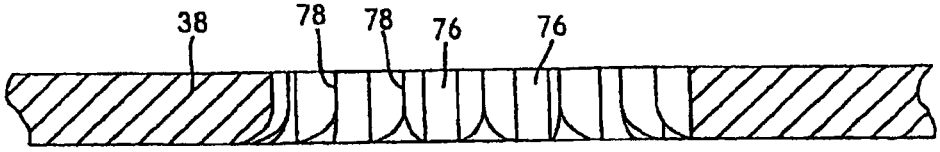
FIG. 4 is an enlarged cross-sectional view of the end member taken along the lines 5-5 of FIG. 3.

The end member 38 is preferably formed from a sheet of carbon steel metal having a predetermined thickness as for example 3.17 millimeters. The end member 38 is formed in a conventional fashion, preferably in a stamping process from the sheet metal stock. The stamping process forms the end member to include a circular exterior periphery and a central opening 76 having an interior periphery formed with annularly spaced inwardly extending pointed projections 78. It will be understood that while the preferred embodiment of the projections 78 is as shown in FIG. 3, the number, size, and geometry of the projections are variable through the design of the punch. The stamping process forms the leading edge of the central opening 76 with a rounded edge 80, as shown in FIG. 4, whereas the opposite edge does not include such a round.

The hollow metal shaft 24 is made by conventional means, preferably a turning process. One end portion, generally shown at 81, of the hollow shaft 24 is shown in detail in FIG. 5. The hollow shaft 24 is formed with a throughbore 26 and an exterior axially outwardly facing shoulder 82 disposed at a distance from a shaft edge 83 greater than the predetermined thickness of the end member 38. A shaft end section 85 extends between the shaft edge 83 and the shoulder 82. A radially inwardly extending circumferential groove 84 is formed in the shaft end section 85 and is positioned between the shaft end section 85 and the shoulder 82. The circumferential groove 84 has a first diameter and the shaft end section 85 has a second diameter. The second diameter is greater than the first diameter.

Figure 6:
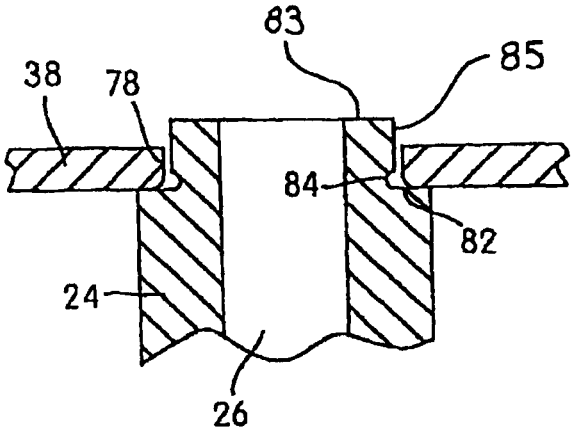
FIG. 6 is an enlarged cross-sectional view of the one end portion of the hollow shaft as it is made initially with the end member seated in abutting engagement with the exterior axially outwardly facing shoulder of the hollow shaft prior to deformation.

In forming the joint 32, an axial movement is effected between the end member 38 and the hollow shaft 24 wherein the fillet edge 80 is used as a lead-in for placement of the end member 38 upon the end portion 81 of the hollow shaft 24 and with the adjacent surface of the end member 38 facing axially inwardly until the latter is moved into abutting engagement to shoulder 82, shown in detail in FIG. 6. The configuration of the projections 78 and the configuration of the periphery of the end portion 81 of the shaft 24 outwardly of the shoulder 82 allows for the end member 38 to be mounted on the end portion 81 of the shaft 24 without interference.

Once the initial mounting has been effected, the assembly is mounted in a punch press wherein a punch 86, preferably tapered in a frusto-conical configuration, is forcibly pressed axially inwardly of the hollow shaft 24 through bore 26 effecting a radially outwardly axially tapered deformation of the metal of the end portion *81* of the hollow shaft 24. FIG. 7 shows the arrangement of the end member 38 and the [one] end portion *81* of the hollow shaft 24 following deformation. *Following deformation, the through bore 26 includes a cylindrical portion 92 and a frusto-conical portion 94 that diverges outwardly from the cylindrical portion 92. The frusto-conical portion 94 has a length 96 that is greater than a length 98 of the shaft end section 85.* The circumferential groove 84 aids the deformation as the punch 86 travels axially inwardly of the hollow shaft 24 through bore 26 and provides a deformation path as the end portion *81* of the hollow shaft 24 deforms radially outwardly. The metal of the sharp projections 78 causes the metal of the [one] end portion *81* of the hollow shaft 24 to be deformed within the spaces between the projections 78, thus embedding the metal of the projections 78 within the metal of the hollow shaft 24. The arrangement of the fillet edge 80 adjacent shoulder 82 and the taper of the punch 86 allows the radially longer opposite edge portion of the projections 78 to receive the deformed metal of the hollow shaft 24.

The punch 86, also shown in FIG. 7, includes an exterior axially outwardly facing annular shoulder 88 positioned to engage and deform a corresponding annular portion of the metal of the hollow shaft during the final extent of movement of the punch 86. The shoulder 88 deforms a corresponding annular portion of the one end portion of the hollow shaft 24 radially outwardly beyond the outwardly facing surface of the end member 38 into abutting engagement therewith forming an overlap 90. Overlay 90 cooperates with shoulder 82 to clamp the end member 38. In addition, the shoulder 88 deforms some of the metal of the hollow shaft 24 axially inwardly increasing the amount of metal of said hollow shaft 24 within the spaces between the projections 78. This increases the torque retention capability of the joint 32. Furthermore, the overlap 90 provides the necessary axial force retention required by many tensioner applications.

The resulting joint between the end member 38 and the hollow shaft 24 possesses a much greater torque retention capability than the prior art, since the metal of the hollow shaft between the projections must shear off in order for the joint to fail. Furthermore, the present invention is more cost effective due to the elimination of an additional manufacturing process and the use of conventional production processes.

In the preferred embodiment, if the sharp projections 78 can be manufactured with a relatively high degree of sharpness, the end member 38 and hollow shaft 24 can have the same degree of hardness. However, due to manufacturing difficulties encountered in ensuring sharp edges on the tips of the sharp projections 78, a greater difference in relative hardness is preferred. By way of example, the shaft 24 is made from a relatively softer material such as SAE J403, 12L14 steel (machined bar stock), having a hardness: Rockwell B 65-85. The end member 38 is made from a relatively harder material such as SAE J404 4130 steel (stamped sheet), having a hardness: Rockwell C 36-46. The hardness can be achieved by furnace heat treat after stamping.

While the present invention has been described in relation to the above exemplary embodiments it will be understood that various modifications may be made within the spirit and scope of the invention. While the objects of the present invention have been fully and effectively accomplished, it will be realized, however, that the foregoing exemplary embodiments have been functional and structural principles of this invention and are subject to change without departure from such principles. Therefore, this invention includes all modifications encompassed within the scope of the following claims.

What is claimed is:

1. A tensioner comprising a fixed structure, a pivoting structure mounted on said fixed structure for pivotal movement about a pivotal axis, a pulley mounted on said pivoting structure for rotational movement about a rotational axis parallel to said pivotal axis, a spring operatively connected between said fixed structure and said pivoting structure resiliently biasing the pivoting structure in one direction, said fixed structure including a hollow shaft and an end member formed of sheet metal of predetermined thickness fixed to an end portion of said hollow shaft, said hollow shaft receiving a bolt for fixedly attaching the tensioner to a mounting structure, said end member engaging said mounting structure for regulating a position of said tensioner relative to said mounting structure, said end member including an opening having a plurality of annularly spaced inwardly extending pointed projections and a mounting knob positioned to engage within an associated mating recess of said mounting structure, said end portion of said hollow shaft having an outwardly extending shoulder and a shaft end section adjacent said shoulder, said end portion including a circumferential groove formed in said shaft end section and positioned between said shoulder and said shaft end section, said circumferential groove having a first diameter and said shaft end section having a second diameter greater than said first diameter, said end member abutting against said shoulder, said end portion being deformed radially outwardly embedding the pointed projections into said hollow shaft, said circumferential groove providing a deformation path as said end portion of said hollow shaft deforms radially outwardly.

2. A tensioner as claimed in claim 1 wherein said plurality of pointed projections each has a rounded edge facing said shoulder.

3. A tensioner as claimed in claim 2 wherein said hollow shaft is deformed to occupy spaces between said plurality of pointed projections.

4. A tensioner as claimed in claim 3 wherein said hollow shaft is deformed to overlap said end member and clamp said end member against said shoulder.

5. A tensioner as claimed in claim 1 wherein said end member is hardened to be relatively harder than said hollow shaft.

6. A tensioner as claimed in claim 1 wherein said hollow shaft has a hardness of between Rockwell B 65-85 and said end member has a hardness of between Rockwell C 36-46.

*7. A tensioner comprising a fixed structure, a pivoting structure mounted on said fixed structure for pivotal movement about a pivotal axis, a drive member mounted on said pivoting structure for rotational movement about a rotational axis parallel to said pivotal axis, a spring operatively connected between said fixed structure and said pivoting structure resiliently biasing said pivoting structure in one direction, said fixed structure including a hollow shaft and an end member fixed to an end portion of said hollow shaft, said hollow shaft including a longitudinally extending aperture that is adapted for receiving a bolt for fixedly attaching the tensioner to a mounting structure, said end member engaging said mounting structure for regulating a position of said tensioner relative to said mounting structure,*

*said end member including an opening,*

*said end portion of said hollow shaft having an outwardly extending shoulder and a shaft end section adjacent said shoulder, said end member abutting against said shoulder, said longitudinally extending aperture being deformed radially outwardly such that said hollow shaft is received in a radially outward direction into said opening,*

*wherein said drive member is adapted to support an endless power transmission element, and*

*wherein said longitudinally extending aperture includes a cylindrical portion and a frustoconical portion that diverges outwardly from said cylindrical portion,*

*wherein said opening of said end member includes a plurality of annularly spaced inwardly extending projections,*

*wherein said longitudinally extending aperture is deformed radially outwardly such that said hollow shaft is received in a radially outward direction into said inwardly extending projections,*

*wherein said end member includes a mounting knob that is adapted to engage within an associated mating recess in said mounting structure; and*

*wherein said end portion of said hollow shaft includes a circumferential groove formed in said shaft end section and positioned between said shoulder and said shaft end section, said circumferential groove having a first diameter and said shaft end section having a second diameter greater than said first diameter, said circumferential groove providing a deformation path as said end portion of said hollow shaft deforms radially outwardly.*

* * * * *